US011935294B2

(12) United States Patent
Koul et al.

(10) Patent No.: US 11,935,294 B2
(45) Date of Patent: *Mar. 19, 2024

(54) REAL TIME OBJECT SURFACE IDENTIFICATION FOR AUGMENTED REALITY ENVIRONMENTS

(71) Applicant: Microsoft Technology Licensing, LLC, Redmond, WA (US)

(72) Inventors: Anirudh Koul, San Jose, CA (US); Baihan Huang, San Jose, CA (US); Sambodhi Chakrabarty, Folsom, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,690

(22) Filed: Sep. 20, 2022

(65) Prior Publication Data

US 2023/0020093 A1 Jan. 19, 2023

Related U.S. Application Data

(63) Continuation of application No. 17/029,797, filed on Sep. 23, 2020, now Pat. No. 11,475,662, which is a continuation of application No. 15/583,775, filed on May 1, 2017, now Pat. No. 10,817,724.

(51) Int. Cl.
*G06V 20/20* (2022.01)
*G06T 7/70* (2017.01)

(52) U.S. Cl.
CPC ............... *G06V 20/20* (2022.01); *G06T 7/70* (2017.01); *G06T 2207/10028* (2013.01); *G06T 2207/30244* (2013.01)

(58) Field of Classification Search
CPC ............ G06T 7/70; G06T 2207/10028; G06T 2207/30244; G06V 20/20
See application file for complete search history.

(56) References Cited

U.S. PATENT DOCUMENTS

| 9,965,471 | B2 * | 5/2018 | Huston | G06T 19/006 |
|---|---|---|---|---|
| 9,984,510 | B1 * | 5/2018 | Kinstner | G06T 15/08 |
| 2014/0184644 | A1 * | 7/2014 | Sharma | G06T 19/006 |
| | | | | 345/633 |
| 2016/0026253 | A1 * | 1/2016 | Bradski | H04N 13/128 |
| | | | | 345/8 |

OTHER PUBLICATIONS

Zhang et al. "Online structure analysis for real-time indoor scene reconstruction." ACM Transactions on Graphics (TOG) 34.5 (2015): 1-13. (Year: 2015).*
"Summons to Attend Oral Proceedings Issued in European Patent Application No. 18724026.2", Mailed Date: Sep. 15, 2023, 8 Pages.
Cornelis, et al., "3D Urban Scene Modeling Integrating Recognition and Reconstruction", In Journal of International Journal of Computer Vision, vol. 78, Oct. 2, 2007, pp. 121-141.

* cited by examiner

*Primary Examiner* — Katrina R Fujita

(57) ABSTRACT

This disclosure describes how to identify objects in an augmented reality environment. More specifically, the various systems and methods described herein describe how an augmented reality device can recognize objects within a real world environment, determine where the object is located, and also identify the various surfaces of the object in real time or substantially real time.

20 Claims, 9 Drawing Sheets

REAL TIME OBJECT SURFACE IDENTIFICATION FOR AUGMENTED REALITY ENVIRONMENTS

CROSS-REFERENCE TO RELATED APPLICATIONS

This application is a continuation of U.S. patent application Ser. No. 17/029,797, filed on Sep. 23, 2020, which is a continuation of U.S. patent application Ser. No. 15/583,775, filed on May 1, 2017, now U.S. Pat. No. 10,817,724, the entire disclosures of all are hereby incorporated by reference herein.

BACKGROUND

Augmented reality devices are computing devices that are able to supplement real world environments with computer-generated graphics, videos, sounds, GPS data, haptic feedback and the like. Thus, a user interacting with an augmented reality device may be able to view and interact with real world objects that have been supplemented or augmented by computer-generated items or information.

In some instances, an augmented reality device may be able to generate a three-dimensional representation of a real world environment and create a depth map of the real world environment. For example, an augmented reality device may be able to recognize large surfaces within the real world environment such as a floor, a ceiling, a wall, a top of a table and the like. However, current augmented reality devices cannot automatically recognize or identify the types of objects or items within the real world environment.

It is with respect to these and other general considerations that examples have been described. Also, although relatively specific problems have been discussed, it should be understood that the examples should not be limited to solving the specific problems identified in the background.

SUMMARY

This disclosure generally relates to identifying real world objects that may be interacted with in an augmented reality environment. For example, an augmented reality device may use a screen, a display, a projector or the like to cause a hologram to appear on, in, around, and/or interact with the real world object. As used herein, the term "augmented reality environment" is an environment that corresponds to a real world environment but is viewed with or through an augmented reality device. The augmented reality device may then cause one or more holograms to interact with various objects in the real world environment.

Accordingly, and as will be described below, the augmented reality system described herein can recognize objects within the real world environment, determine where the object is located in an enhanced depth map associated with the real world environment, and identify various surfaces of the object in real time or substantially real time. The augmented reality system can also generate holograms that interact with the various objects. However, because the augmented reality system can identify what the real world objects are, the user experience with the augmented reality environment may be enhanced.

For example, not only can the augmented reality device generate holograms that automatically interact with an identified object or objects, the holograms may be automatically resized and/or positioned based on a size and/or an orientation of the object.

As used herein, the term "hologram" is used to describe any computer generated item that may be projected onto, around, within, above, or below an identified real world object to appear as if the computer generated item is part of the object, is associated with object and/or is interacting with the object. Additionally, a hologram may be associated with various sounds, smells, haptic feedback and the like.

Accordingly, described herein is a method for recognizing a real world object for an augmented reality environment. This method includes receiving a plurality of images of a real world environment and analyzing the plurality of images to identify an object contained within the plurality of images. The object contained within the plurality of images corresponds to a real world object in the real world environment that is to be identified for the augmented reality environment. The method further includes analyzing the plurality of images to determine a location of one or more portions of the object within the image and projecting the determined location of the one or more portions of the object within the plurality of images to a corresponding location in an enhanced depth map associated with the real world environment. The identification of the object is then associated to the corresponding location in the enhanced depth map.

Also described is a system, comprising a processing unit and a memory for storing instructions that, when executed by the processing unit, performs a method for identifying a real world object for an augmented reality environment. This method includes capturing a plurality of images of a real world environment from a plurality of different positions within the real world environment and identifying an object contained within one or more images of the plurality of images. A location of the object within the one or more images is determined. Once the location is determined, the method determines one or more edges of the object within the one or more images and projects the one or more edges of the object within the one or more images to corresponding locations within an enhanced depth map to identify a surface of the object for the augmented reality environment.

The present disclosure also describes a system that includes a processing unit and a memory for storing instructions that, when executed by the processing unit, performs a method for identifying a real world object for an augmented reality environment. This method includes capturing a plurality of images at different positions in a real world environment and analyzing the plurality of images to identify an object contained within one or more of the plurality of images. Two dimensional coordinates of at least a portion of the object within the image are determined and those coordinates are converted to three dimensional coordinates associated with an enhanced depth map. The identification of the object is then associated with the three dimensional coordinates associated with the enhanced depth map.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
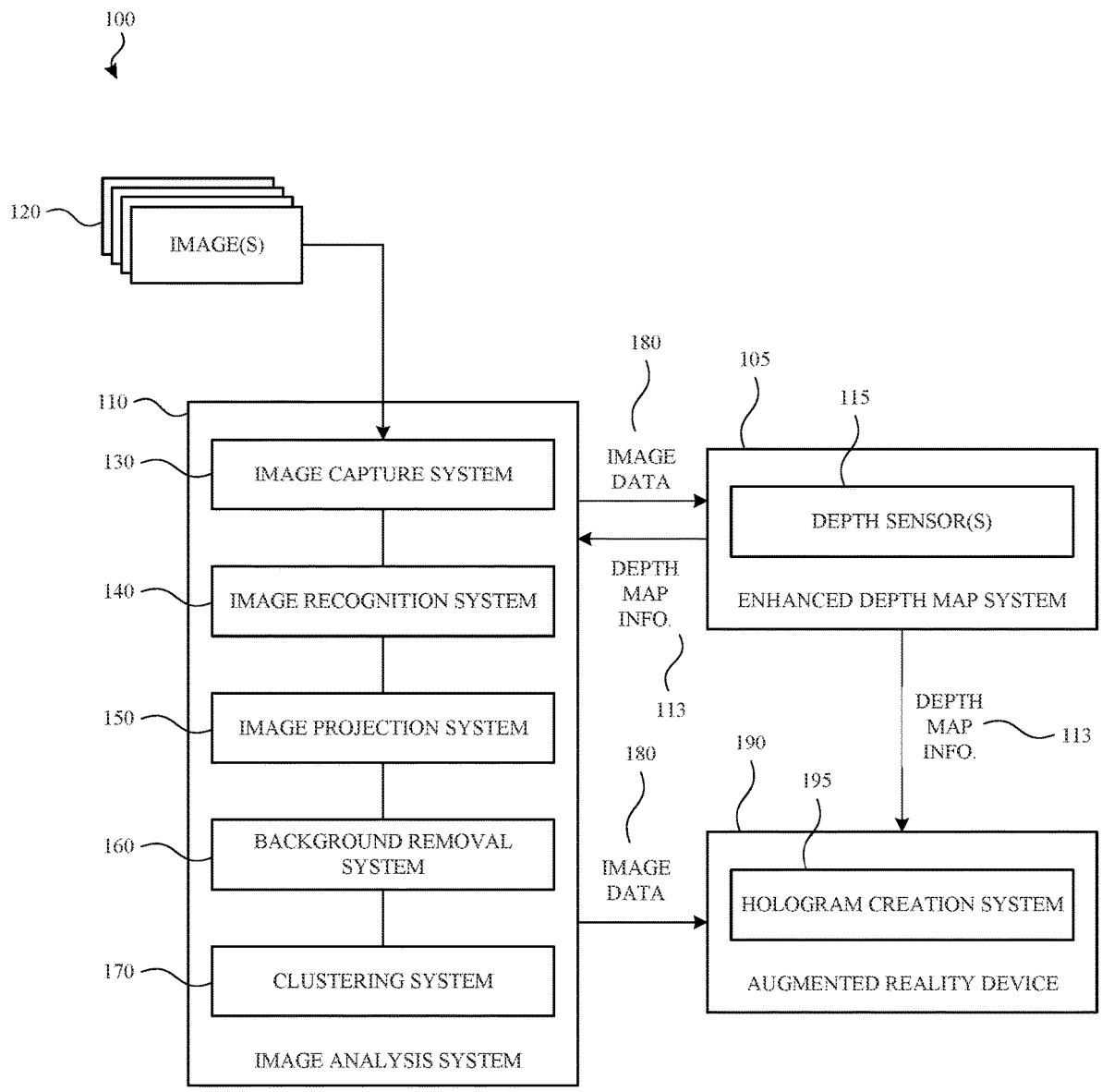
FIG. 1 illustrates a system for identifying objects in a real world environment according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Current augmented reality devices give users a live direct view, or a live indirect view, of a real world environment in which some of the objects within the real world environment have been enhanced, augmented by, or supplemented with, computer generated data or information. In some instances, the computer generated data or information may include sounds, video, graphics or any combinations thereof.

In some cases, an augmented reality device uses a depth sensor to recognize surfaces in the real world environment. However, the surfaces that are identified may be limited to floors, ceilings, walls, and other large surfaces (e.g., a surface of a table).

Once a surface is identified, the augmented reality device may display various computer generated holograms on or around the surface in an augmented reality environment. However, the position of the hologram, as well as the size and orientation of the hologram, is typically adjusted or changed manually by a user. For example, the size of the hologram may be adjusted by hand gestures from the user or other such input.

In addition to the shortcomings listed above, and although a current augmented reality device can recognize a surface, it does not have knowledge of what the surface is or how the surface relates to an object. For example, the augmented reality device does not know that one surface is a table while another surface is a chair.

Additionally, the augmented reality device cannot recognize or determine a context for real world objects that interact with the various holograms that are generated by the augmented reality device. For example, because the augmented reality device cannot determine whether the object is a sofa, a television, a chair, a human, a monitor or other such objects, it cannot create, display or project a hologram that automatically interacts with the object.

In contrast to current augmented reality devices, the augmented reality system described herein is able to identify real world objects. In some cases, the identification may occur in real time or substantially real time. As such, the augmented reality system may generate, provide, display and/or project a hologram into an augmented reality environment that interacts with the object.

The augmented reality system of the present disclosure is configured to generate a model of a real world environment. This model is referred to herein as an "enhanced depth map." The enhanced depth map is used to identify surfaces of various objects that exist in the real world environment, determine where the objects are located and also identify what the objects are. The enhanced depth map, and the objects contained therein, corresponds to the real world environment and the objects within the real world environment.

Further, the enhanced depth map may be used or otherwise associated with the augmented reality environment. For example, when the augmented reality system generates various holograms that are instructed to interact with various objects, the enhanced depth map may provide location information, surface information, identity information and so on to an augmented reality device. Once this information is received, the augmented reality device may cause the holograms to interact with the objects in the augmented reality environment as instructed.

For example, the augmented reality device may include a lens or screen that enables a user to view an augmented reality environment, that corresponds to the real world environment, through the lens or the screen. When a hologram is created, the hologram may be displayed on the lens or screen of the augmented reality device but appear to interact with the real world objects.

Accordingly, and as will be described below, the system and methods described herein, enable an augmented reality system to identify a real world object that is present in the real world environment, determine where the object is located in the real world environment and where it is located in a corresponding enhanced depth map. The augmented reality system can also identify the various surfaces of the object. For example, the augmented reality system described herein may be able to identify that a particular object is a television. The augmented reality system may also be able to identify the coordinates of the television and all of the surfaces of the television with respect to the room in which it is located.

The object information may be used to develop a wide range of holograms for the augmented reality environment. For example, a developer may be able place holograms on a surface of the object, enable the hologram to interact with the object, automatically resize the hologram with respect to the dimensions of the object without manual user input, adjust an orientation of a hologram based on a determined orientation of one or more surfaces of the object without manual user input and so on.

In order for the augmented reality system to recognize various real world objects in the real world environment, the augmented reality system creates or generates an enhanced depth map. Information for the generation of the enhanced depth map is received by one or more depth sensors of the augmented reality system.

In some cases, the enhanced depth map may be an image or model of the real world environment that contains information about various surfaces in the real world environment.

The information contained in the enhanced depth includes three dimensional coordinates of the various surfaces of the objects, color coordinates of the various surfaces of the objects, and/or a distance of the various surfaces of the object from a particular viewpoint (e.g., a viewpoint from which the image was captured). The enhanced depth map also includes identifiers or labels that are associated with each object. For example, various three dimensional coordinates within the enhanced depth map may be associated with labels that identify the object at those coordinates. The object labels, along with the coordinates, may then be used to identify the objects within the augmented reality environment.

For example, once the enhanced depth map for the particular real world environment has been generated, the augmented reality system may capture or receive images. The images may be captured as a user interacts with or walks around the real world environment. Further, the images may be captured from a number of different angles and positions within the real world environment. Once the images have been captured, the images are analyzed to detect the various objects that are present in the images.

In some cases, the images are analyzed using bounding boxes, segmentation algorithms or masks, pixel-level masks and so on. Using these processes, various objects within the image may be identified or recognized. For example, using a bounding box and/or a segmentation algorithm, the augmented reality system may be able to determine that the object within the captured image is a chair, a couch, a television, a toy, human, an animal and so on.

Once the objects within the images are identified, the augmented reality system executes a reverse ray-tracing algorithm that converts two dimensional coordinates of an object within an image to three dimensional coordinates within the enhanced depth map. Using this process, the augmented reality system is able to determine a location of the object in the enhanced depth map as well as the identity of the object in the enhanced depth map and provide that information to the augmented reality device.

In some examples, the reverse ray-tracing algorithm traces a path of a ray of light, or a photon, from the various pixels in the image back to a corresponding surface of the object in the enhanced depth map. As the path of the photon is projected or traced from the pixel in the image back to the enhanced depth map, the photon will eventually strike a surface of the object represented in the enhanced depth map. The location of where the photon strikes the surface is recorded and used to identify at least a portion of a surface of the object. Because a reverse ray-trace is performed on a plurality of the images, most, if not all portions of the surfaces of the object may be hit by these photons. As such, various surface points of the object may be tagged or otherwise identified.

As more points of the object are struck from different angles using the reverse ray-tracing algorithm, a clustering algorithm may be used to identify the surfaces of the object from different viewpoints. Because the type of the object was identified in the photograph, one or more labels may be associated with the location of the object in the enhanced depth map. The identification of the type of the object may also be used when holograms are projected within the augmented reality environment.

These and other examples will be described in more detail below with respect to FIGS. 1-4.

FIG. 1 illustrates an augmented reality system 100 for identifying objects in a real world environment. Once the objects in the real world environment have been identified, the augmented reality system 100 may be used to generate various holograms that interact with the various objects.

The augmented reality system 100 includes an enhanced depth map system 105 that includes one or more depth sensors 115. The depth sensors 115 may be used to generate a depth map of the real world environment. As described above, the depth map may be an image of the real world environment that contains information about various surfaces in the real world environment. The depth map may include three dimensional coordinate information for various objects that exist in the corresponding real world environment.

As will be described below, the coordinate information may then be enhanced by various labels associated with identified objects. As such, the enhanced depth map system 105 may communicate with an image analysis system 110 and/or an augmented reality device 190 that generates holograms that interact with the various objects that were identified within the enhanced depth map. For example, the enhanced depth map system may receive image data 180 (e.g., labels, two dimensional coordinate information of objects and so on) from the image analysis system 110 and/or provide depth map information 113 to the image analysis system 110. Likewise, the enhanced depth map system 105 may provide enhanced depth map information 113 to the augmented reality device 190.

As briefly described above, the augmented reality system 100 may include an augmented reality device 190. The augmented reality device 190 may be a wearable device such as, for example, glasses, a watch, or other such wearable computing devices. A user may be able to view the real world environment though a screen or lens of the augmented reality device 190. However, the augmented reality device 190 may also create various holograms that interact with the real world objects thereby creating an augmented reality environment. Accordingly, as holograms are created and displayed on the screen or the lens of the augmented reality device 190 (or projected into the real world environment), the hologram may appear to the user as if the holograms are interacting with the real world objects.

Although the augmented reality device 190 is described as a wearable device, the augmented reality system 100 and/or the augmented reality device 190 may be associated with or otherwise be incorporated into a desktop computer, a laptop computer, a tablet computing device, a video gaming device and the like. Further, although the augmented reality device 190 was described above as including a display or lenses, the augmented reality device 190 may project a hologram or other such images and data directly on a real world object.

The augmented reality system 100 may also include an image analysis system 110. The image analysis system 110 may be configured to receive various images 120 of the real world environment. In some cases, the image analysis system 110 may include an image capture system 130 that captures various images of the real world environment from many different viewpoints. For example, as the image capture system 110 is moved around the real world environment, it may capture various images 120 of the real world environment. In other cases, the image analysis system 110 may receive images of the real world environment from one or more external sources. These external sources may include web pages, live video feeds from one or more video cameras (both fixed and movable), images captured from one or more external image capture devices (both fixed and moveable) and so on.

In some cases, the image capture system 130 (e.g., an image sensor, a camera or the like) may be part of or otherwise associated with the image analysis system 110. In yet other cases, the image capture system 130, as well as the other systems shown and described with respect to FIG. 1, may be separate systems but configured to transmit information from one system to another over a wired and/or a wireless connection. For example, the image capture system 130 may consist of one or more stationary and/or moveable cameras the capture images of the real world environment. These images may then be communicated to the image analysis system 110. In other cases, the image capture system 130 may be part of an augmented reality device 190.

Figure 2:
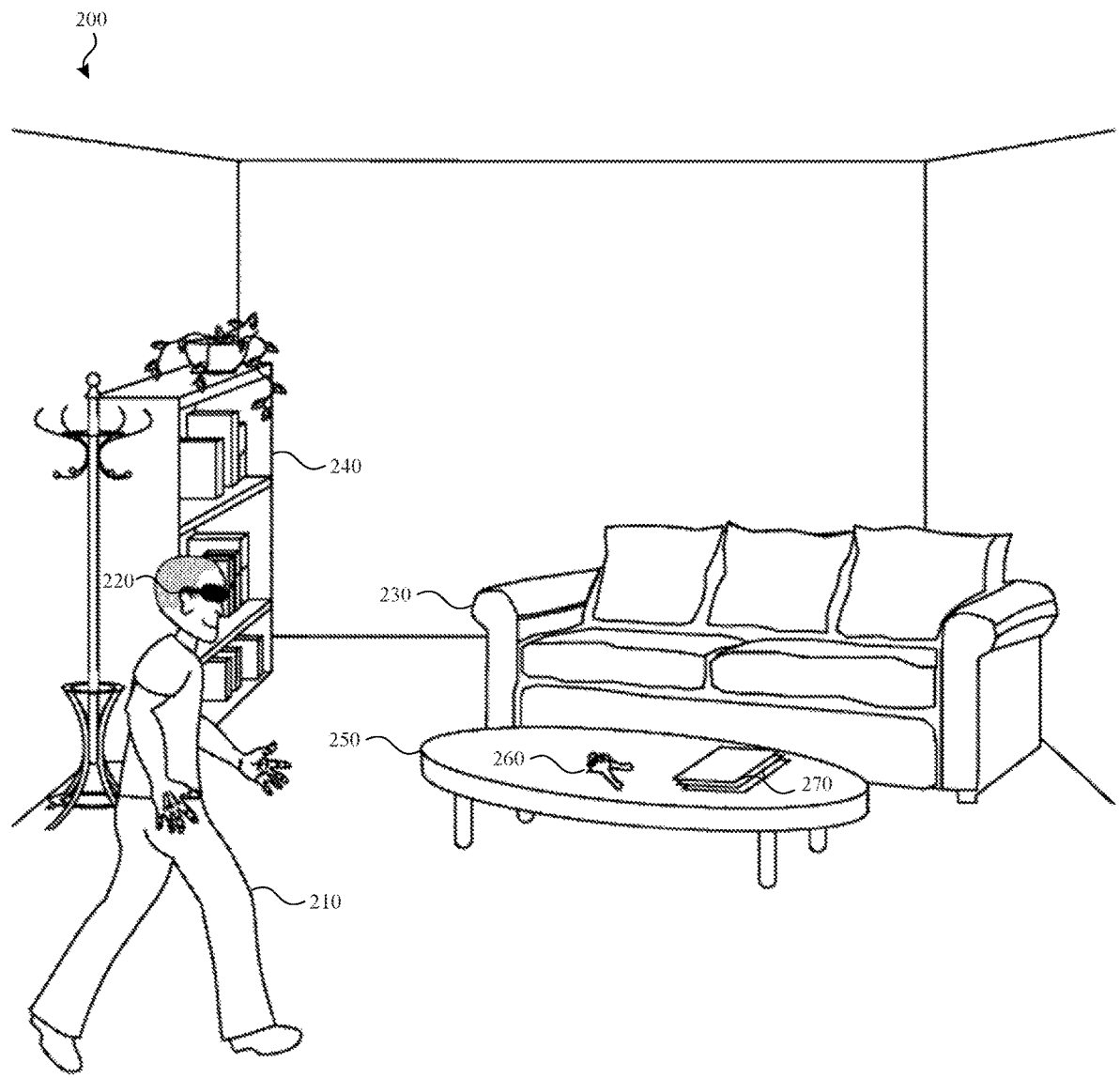
FIG. 2 illustrates an example real world environment containing various objects that may be identified by the system described herein.

For example, and referring to FIG. 2, an individual 210 may be wearing an augmented reality device 220 as he moves around in a real world environment 200. In some implementations, an enhanced depth map system may have generated (or may generate) a model or enhanced depth map of the real world environment 200. As described above, the enhanced depth map may include information regarding coordinates of the various objects in the real world environment including a distance between a surface of the object and a viewpoint or location of one or more of the depth sensors associated with the enhanced depth map system.

As the individual 210 moves within the real world environment 200 the augmented reality device 220 (or more specifically an image capture system or camera associated with the augmented reality device 220) may capture or receive various images of the real world environment 200. Each image may be taken from a different angle, position and/or view point. In some cases, this may be after the enhanced depth map is generated or simultaneously or substantially simultaneously with the generation of the enhanced depth map.

For example, the real world environment 200 may include a couch 230, a bookcase 240 and a table 250. Additionally, the real world environment 200 may also include walls, a ceiling and a floor. As the individual moves around in the real world environment 200, various images of each of the objects are captured.

Once the images are captured, they are analyzed to identify the various objects within the images. For example, various object recognition techniques may be used to identify the objects. The two dimensional coordinates of the objects within the images are also identified. The two dimensional coordinates from the images are converted into corresponding three dimensional coordinates within the enhanced depth map. The object identification information associated with the two dimensional coordinates are also provided to the enhanced depth map and associated with the three dimensional coordinates. Once the objects are identified in the enhanced depth map, that information may be utilized by the augmented reality device 220 to generate holograms that interact with those objects.

For example, if the augmented reality device 220 identifies a table 250 in the real world environment 200, it may generate holograms of a set of keys 260 or books 270 on the table 250. In another example, the augmented reality device 220 may identify that the real world object is couch 230. As such, the augmented reality device 220 may generate a hologram of a person that walks around the couch, sits down on the couch, and so on.

Referring back to FIG. 1, once the depth map has been created and the various images have been captured and/or received, the image analysis system 110 may utilize an image recognition system 140 to identify objects that exist in the real world environment.

As described above, the images 120 that are used by the image recognition system 140 to identify the various objects may be captured from a number of different angles and locations within the real world environment. For example, as the image analysis system 110 moves around the real world environment, the image capture system 130 captures or otherwise receives various images of the real world environment including the various objects or other items within the real world environment. Each of the images 120 may show the various items or objects within the room at different angles or viewpoints. In some cases and as described above, previously captured images may be sent to the image recognition system 140 from one or more external sources.

Once the images 120 have been captured or received, the images 120 may be analyzed by additional systems of the image analysis system 110 in real time or substantially real time such that objects within the real world environment may be identified in real time or substantially real time.

For example, once the images 120 have been captured and/or received, the image recognition system 140 analyzes the images 120 to identify various objects that are contained within the images 120. Although the term "object" is used throughout this disclosure, as used herein, the term "object" includes objects, items, persons, animals and other such things that can exist in a real world environment and that can be interacted with in the corresponding augmented reality environment.

In some instances, the image recognition system 140 may use a bounding box, a segmentation algorithm, a pixel-level mask and the like to identify the object within the image. These same processes may also be used to identify position information about the objects within the image. These processes may also be used to determine which pixels of the image are associated with one or more edges of the object. Once the edges of the object are identified in image, the edges may be projected from the image back into the enhanced depth map associated with the real world environment and/or the augmented reality environment and used to identify the edges or a location of the corresponding real world object.

When the image capture system 130 captures an image 120, the image capture system 130 captures various rays of light, or photons, that are reflected from the various surfaces of the object in the real world environment. More specifically, an image is two dimensional representation of the real world in three dimensions, and is formed by rays of light reflected from a real world surface being captured in a two dimensional plane of the camera device. As described below, by reverse ray-tracing any pixel of this image to the enhanced depth map, the origination point of any pixel in the three dimensional world may be found and/or identified.

Once the images 120 have been analyzed and the objects have been identified, an image projection system 150 utilizes a reverse ray-tracing algorithm to project a recognized area of the object within a given image 120 back into the enhanced depth map. This projection may then be used to determine an approximate location of a corresponding surface of the object within the enhanced depth map.

The reverse ray-tracing algorithm uses position information and/or orientation information associated with each image 120 to trace the ray of light from a given pixel in the image 120 back to a corresponding surface of the object within the enhanced depth map from which it was reflected when the image 120 was originally captured. The point at which the ray of light, that is projected or traced from a particular pixel, hits the corresponding portion of a surface of the object within the enhanced depth map is referred to herein as an intersection point.

For example, when a particular pixel in the image is selected, the two dimensional coordinates of the particular pixel are known. The reverse ray-tracing algorithm is used to convert the two dimensional coordinates of the particular pixel in the image into three dimensional coordinates within the enhanced depth map. Once the location of the pixel is known in the enhanced depth map, the object associated with that location may be identified.

For example and as described above, the image recognition system 140 identified the object that the pixel is associated with. In some cases, that pixel may be associated with a label. Thus, when the pixel is projected back into the enhanced depth map and strikes a surface of an object in the depth map, the label may be associated with that object. Thus, the object is identified.

In some cases, the reverse ray-tracing algorithm may be used on any number of pixels in a given image 120. In other cases, since a bounding box, segmentation algorithm, or a pixel-level mask may be used to identify the edges of a particular object, the reverse ray-tracing algorithm may be executed on the pixels that are associated with the edges of the object. Once the edges of the object are known, the various surfaces of the object may be identified. Accordingly, fewer processing resources may need to be expended when the edges of an object are identified versus processing each pixel associated with an object.

Because a given image 120 may capture only a portion of an object, the image projection system 150 may execute the reverse ray-tracing algorithm on various images to better determine various surfaces of the object. As each image 120 is analyzed, additional surfaces and/or edges of a particular object are identified. For example, intersection points that are obtained from a single image may only represent a sub-region of a surface of an object. Accordingly, higher coverage for one or more surfaces of an object may be obtained from multiple images 120 that were captured from different viewpoints.

Further and as described above, the reverse ray-tracing algorithm may be executed on captured images in real time or substantially real time. As such, objects and/or surfaces within the enhanced depth map may be identified or recognized as a user wearing or otherwise using the augmented reality device moves around in the real world environment.

The image analysis system 110 also includes a background removal system 160. The background removal system 160 may be configured to remove intersection points that do not correspond to the real world object being identified in the image 120.

For example, when the image recognition system 140 identifies a particular object within an image 120, the object may have a shape that does not correspond to a shape of the bounding box that surrounds it. As such, as the image projection system 150 executes the reverse ray-tracing algorithm on the object, intersection points that are not associated with the object may be inadvertently returned.

For example, the object in a captured image may be lamp. Different portions of the lamp may have various dimensions that do not fit squarely within a bounding box. For example, the lamp shade may have a first dimension and the lamp column or body may have a second dimension that is smaller than the first dimension. The bounding box may be rectangular and have dimensions such that the entire lamp, including the lamp shade and the lamp column, is included within the bounding box. However, since the lamp column has a smaller dimension than the lamp shade, any item or object (e.g., a wall, a curtain etc.) that is located behind the lamp column in the particular image may cause one or more erroneous object intersection points to be returned during the reverse ray-tracing algorithm.

Accordingly, the background removal system 160 removes the various intersection points that are not on a surface of the recognized object. In some cases, the removal of these extra intersection points may be achieved using various methods. These methods may include, but are not limited to outlier removal algorithms, Gaussian density estimation algorithms, clustering algorithms and the like.

In some embodiments, the background removal system 160 may analyze various sequences of images to determine which intersection points should be removed and which are associated with various objects. For example, if an intersection point is present in one image but is missing from one or more subsequent images that capture the object from a different viewpoint, the background removal system may determine that the intersection point is erroneous (e.g., associated with the background of an image such as, for example, a wall or a curtain) and is not an intersection point associated with the identified object.

Once any erroneous intersection points have been removed, a clustering system 170 groups the intersection points from the various images 120 together. For example, the clustering system 170 determines which intersection points are associated with the same object and groups those intersection points together. For example, if a group of intersection points are clustered together in the enhanced depth map, the clustering system 170 may determine that each of these intersection points is part of the same object. In other examples, the reverse ray-tracing algorithm may be used to identify various edges of object within the enhanced depth map. As such, any intersection points that fall within the boundaries of the edges may be determined to be part of the same object.

In some cases, object labels for the object (e.g., object labels determined by the image recognition system 140) are also provided to the clustering system 170. Thus, when the intersection points from the various images 120 are aggregated, the various surfaces of the object, from many different viewpoints, may be recognized in the enhanced depth map and used by the augmented reality device when generating holograms for the augmented reality environment.

Although the examples above are used to show how a single object is identified, the augmented reality system 100 may recognize many different objects in a real world environment simultaneously or substantially simultaneously. For example, the image recognition system 140 may identify multiple objects of the same or different types. As such, each object will be given a different label.

For example, a first chair that is identified in the augmented reality environment may be given a label "chair-1", a second chair is given a label "chair-2", a television may be given the label "television-1" and so on. As the different intersection points are aggregated (in some cases using the location information associated with the intersection points), the labels may be used to differentiate similar objects within the enhanced depth map.

In some cases, the clustering system 170 may perform the clustering algorithm each time a new image is received. In other cases, the clustering algorithm may be executed when the number of captured images 120 reaches or exceeds a threshold amount.

Once the various surfaces of the object have been identified, image data 180 may be transmitted (e.g., through a wired or wireless connection, through an internet connection or network etc.) or otherwise provided to the augmented reality device 190. The augmented reality device 190 may include a hologram creation system 195 that is configured to generate one or more holograms. The holograms may be projected or otherwise displayed (e.g., through a display, lenses, etc.) on the surface of the object. In other implementations, the hologram may interact with the object. For example, if it is determined that the enhanced depth map includes various plants positioned around a room, the hologram creation system 195 may generate a hologram of a robot that travels around the room and interacts with (e.g., "waters") each plant.

Further, because each surface and orientation of the object within the enhanced depth map is known, the hologram creation system 195 can adjust the size and orientation of the hologram. For example, the augmented reality device 190 may be configured to project a hologram of a movie on a television screen for the augmented reality environment. Because the dimensions and the positioning (e.g., angle of the screen) of the television are known, the hologram creation system 195 can generate and project the hologram so that it automatically fits the dimensions of the television.

Although FIG. 1 shows the enhanced depth map system 105, the image analysis system 110 and the augmented reality device 190 as separate systems, each of these systems may be combined into a single unit. However, regardless of whether they are combined or separate, each system may be configured to communicate information to the other systems. For example, the enhanced depth map system 105 may communicate information about the enhanced depth map to the augmented reality device 190 and the image analysis system 110. Likewise, the image analysis system 110 may share image data 180 with the augmented reality device 190 and the enhanced depth map system 105.

Figure 3:
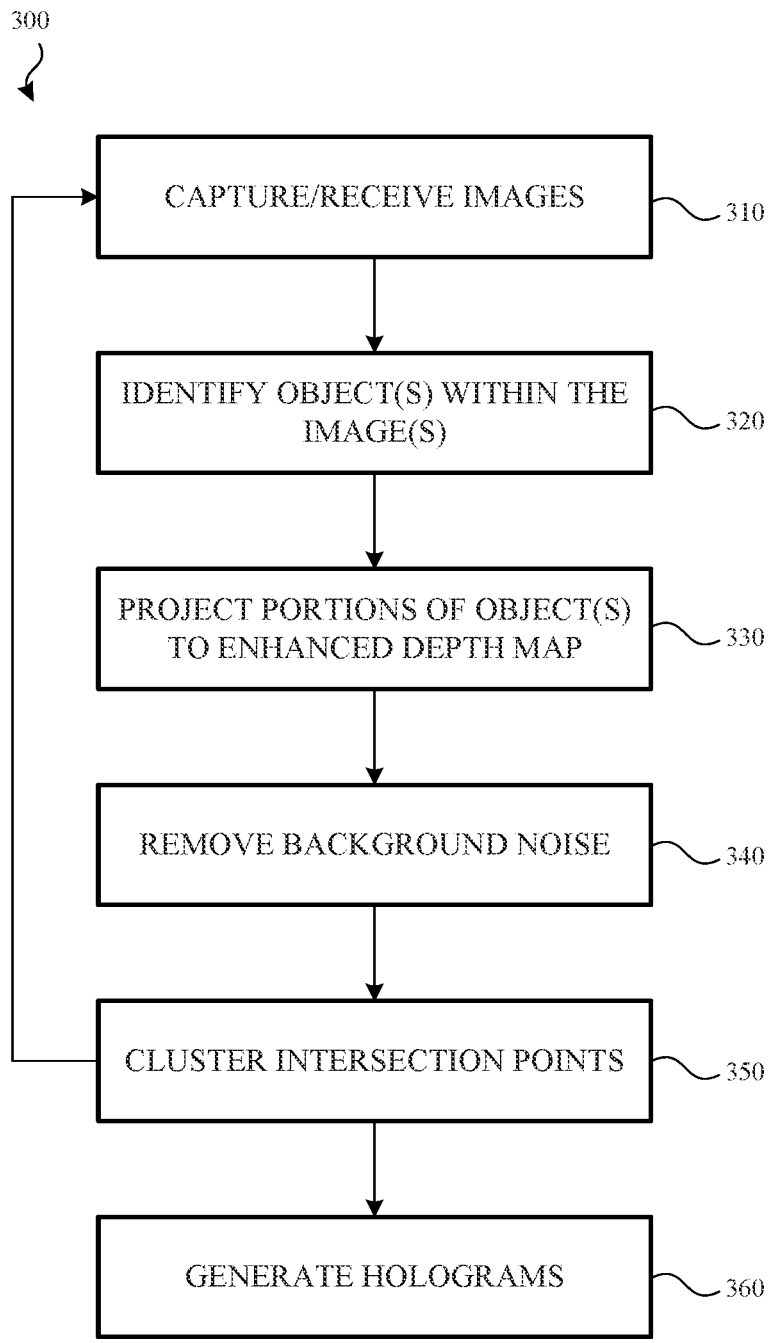
FIG. 3 illustrates a method for identifying objects for an augmented reality environment according to an example.

FIG. 3 illustrates a method 300 for recognizing or otherwise identifying real world objects for an augmented reality environment. In some examples, the method 300 may be used by the augmented reality system 100 or the various systems of the augmented reality system 100, described above with respect to FIG. 1.

FIG. 3 begins at operation 310 in which one or more images of a real world environment are captured and/or received (e.g., by an augmented reality system). The images may be captured by an image sensor or other such image capture system, such as, for example, image capture system 130, that is a part of an image analysis system. In other cases, the images may be captured by an image sensor, a camera, or other such device is separate from the image analysis system and/or the augmented reality system.

For example, one or more cameras may be positioned at various locations within the real world environment. The cameras may be still cameras or moveable cameras. Once these devices capture the images, they may be transmitted or otherwise communicated to the augmented reality system. In yet other examples, the image analysis system may capture images using an associated image capture device and receive additional images from other image capture devices.

In one example, the various images that are captured by the image capture device are still images. In other examples, the images may include video, images bursts or any combinations thereof.

Once the images have been captured and/or received, flow proceeds to operation 320 and one or more objects within the image are identified. In some cases, the objects within the image may be recognized or otherwise identified by an image recognition system such as, for example, image recognition system 140. The objects may be identified using various object recognition techniques. For example, the shape of an object, the color of an object, the size of an object or any other feature of an object may be compared against other object features, or the objects themselves, in an object database.

In another example, a bounding box, segmentation algorithm, or a pixel-level mask may be used to identify the one or more objects in an image. These processes may also be used to determine position and/or orientation information about the object. In yet other examples, these processes may be used to determine one or more edges of each object in the image and/or which pixels of images are associated with the various edges of the object.

As part of the identification process, the image recognition system may associate a label with a pixel or group of pixels associated with the object. The label may also be associated with a bounding box, a pixel-level mask, a segment of the image, a determined location of the object within the image and so on.

Once the objects in the image have been identified, flow proceeds to operation 330 and portions of the object are projected into an enhanced depth map associated with the real world environment and/or the augmented reality environment. In some examples, operation 330 may be executed by an image projection system such as, for example, image projection system 150.

As described above, the image projection system may utilize a reverse ray-tracing algorithm to project a recognized area of the object within a given image back to a surface of the object in the enhanced depth map. The projection may also provide an approximate location and/or an orientation of a surface of the object within the enhanced depth map.

In some cases, the reverse ray-tracing algorithm may be used to trace the path of a photon from any number of pixels back to the surface of an object that is represented in the enhanced depth map. In cases in which a bounding box or a pixel-level mask has been used to identify the object and the edges of the object, the reverse ray-tracing algorithm may be used on the pixels that are identified as being associated with the edges of the object.

Because a given image may only capture a portion of a surface of an object, the reverse ray-tracing algorithm may be performed on various images. As this algorithm is executed on additional images, additional surfaces of a particular object may be identified.

Flow then proceeds to operation 340 and background noise associated with the object and/or the image may be removed. In some examples, the augmented reality system may include a background removal system such as, for example, background removal system 160. The background removal system may be configured to remove intersection points (e.g., points at which photons that originated from a pixel in an image were traced back to a surface of the object in the enhanced depth map) that do not correspond to the object that is identified in the image. As described above, the removal of these extra intersection points may be achieved using various methods such as, but not limited to, outlier removal algorithms, Gaussian density estimation algorithms, clustering algorithms and the like.

Once the erroneous intersection points have been removed, flow proceeds to operation 350 and a clustering system, such as, for example, clustering system 170, groups the intersection points from the various images together. For example, the clustering system may be configured to determine which intersection points from each image are associated with the same object. The clustering system may then group those intersection points together.

In some cases, object labels that were generated in operation 320 are also provided to the clustering system. Thus, when the intersection points from the various images are aggregated, the various surfaces of each of the objects may be recognized in the enhanced depth map. This information may then be provided to the augmented reality device as it generates holograms for the augmented reality environment. Flow may then proceed back to operation 310 and the method 300, or various operations of the method 300 may be repeated.

Flow may also proceed to operation 360 in which one or more holograms are generated. The generated holograms are configured to interact with the objects. For example, a hologram may be projected or otherwise provided on a screen or a lens of the augmented reality device. As such, it may appear to the individual using the augmented reality device that the hologram is interacting with the real world object. As the method 300 was used to identify the object and to identify the location of the object and the various surfaces of the object, the hologram generated in operation 360 may be configured to interact with the object in more of a lifelike or real manner than was previously achievable.

For example, the operations of the method 300 enable the augmented reality system to determine a context of the one or more objects that have been represented in the enhanced depth map. As such, one or more holograms may be created and/or generated to interact with the object based on that context.

Figure 4:
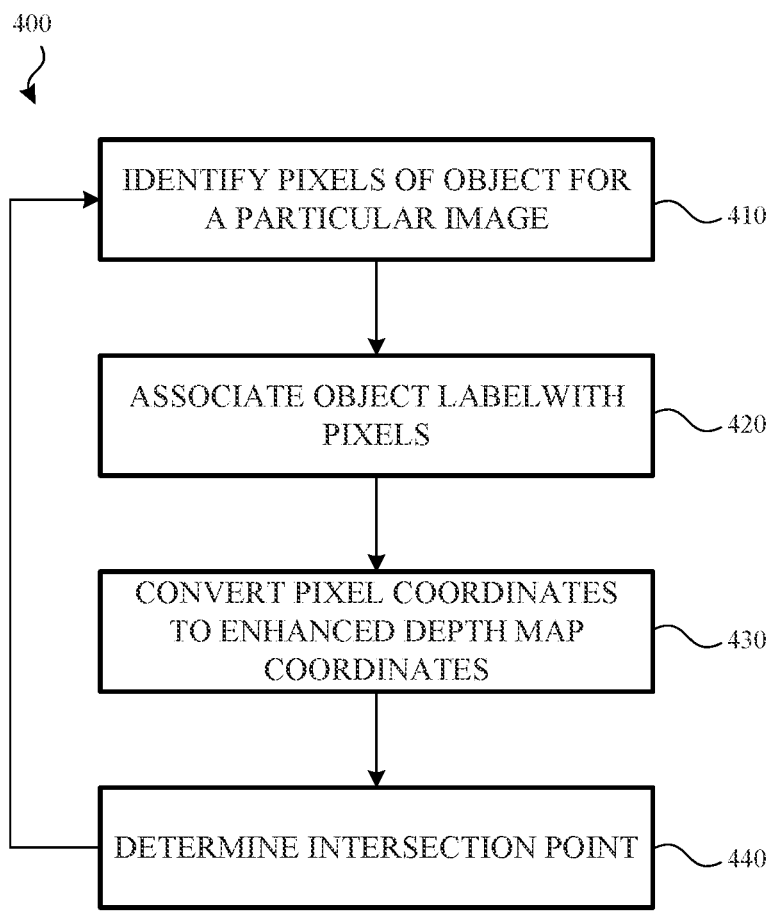
FIG. 4 illustrates a method for performing a reverse ray-tracing algorithm according to an example.

FIG. 4 illustrates a method 400 for performing a reverse ray-tracing algorithm according to an example. In some cases, the method 400 may be used by the augmented reality system shown described above with respect to FIG. 1. In other examples, the reverse ray-tracing algorithm may be used as part of the projection operation 330 described above with respect to FIG. 3.

Method 400 begins at operation 410 in which a one or more pixels of an object within an image are identified. In some examples, the pixels may be associated with an edge of an object. For example, the pixels of the object may be identified using a bounding box, a segmentation algorithm, a pixel-level mask and so on.

Once the pixels of the object have been identified, flow proceeds to operation 420 and the pixels are associated with an object label. The object label may be an identifier of the object. For example, if it was determined that the object in a given image is a chair, that label may be associated with various pixels in the image that make up the chair. In other implementations, the segmentation algorithm (or the other processes described above) may also be used to determine location information associated with a particular object or portions of the object. In such cases, the label for the object may be associated with the location information.

Flow then proceeds to operation 430 and coordinates of the pixel in the two dimensional image are converted into three dimensional coordinates within an enhanced depth map associated with the real world environment. In some cases, a reverse ray-tracing algorithm is used to determine where a pixel in the image would be located in the enhanced depth map. The reverse ray-tracing algorithm may be performed by a projection system such as described above with respect to FIG. 1.

In some cases, the reverse ray-tracing algorithm selects a pixel that is associated with an edge (or other portion) of the object that was identified in the image and determines its two dimensional coordinates within the image. Those two dimensional coordinates are then converted into three dimensional coordinates within the three dimensional plane.

For example, the algorithm traces a path of a photon that was used to generate the pixel in the image, from the pixel back into the enhanced depth map. The path of the photon is traced until it would strike the surface of an object located in the enhanced depth map. The location of the surface may then be used to identify the object.

Flow then proceeds to operation 440 and an intersection point of the photon is determined. As described above, the intersection point is a point at which the photon that is projected or traced from the pixel in operation 430 hits a corresponding portion of the surface of the object in the enhanced depth map. Since the reverse ray-tracing algorithm uses position information and/or orientation information associated with the pixel, and that information is associated with an object label, the object identification information may be used by the augmented reality device as it generates holograms for the augmented reality environment. The various operations of method 400 may then be repeated for different images and/or different portions of the same image.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of electronic device configurations that may be utilized for practicing aspects of the disclosure, as described herein.

Figure 5:
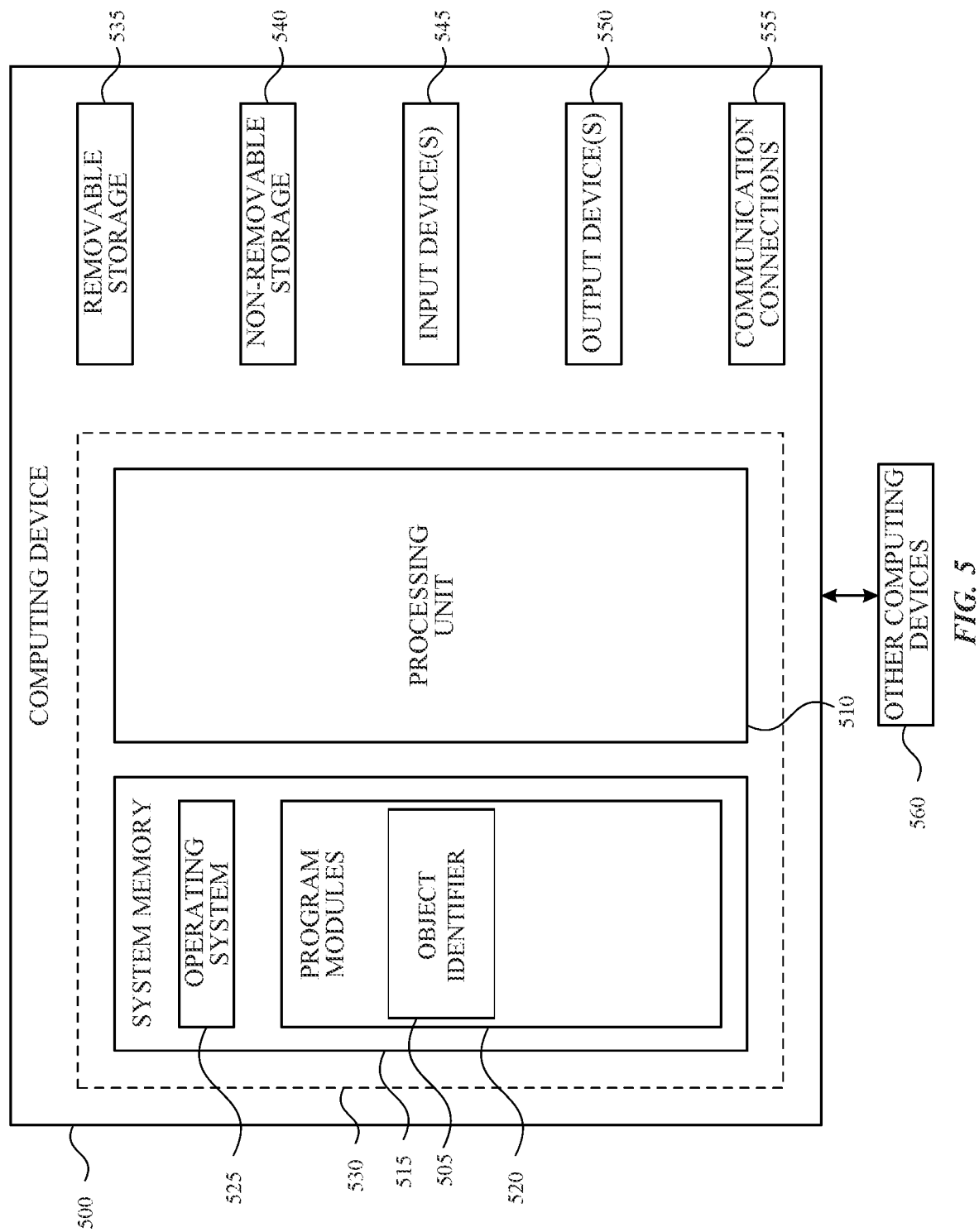
FIG. 5 is a block diagram illustrating example physical components of a computing device with which aspects of the disclosure may be practiced.

FIG. 5 is a block diagram illustrating physical components (e.g., hardware) of an electronic device 500 with which aspects of the disclosure may be practiced. The electronic device 500 may be similar to the augmented reality device described above with respect to FIG. 1. The components of the electronic device 500 described below may have computer executable instructions for automatically identifying issues in a software suite such as described above.

In a basic configuration, the electronic device 500 may include at least one processing unit 510 and a system memory 515. Depending on the configuration and type of electronic device, the system memory 515 may comprise, but is not limited to, volatile storage (e.g., random access memory), non-volatile storage (e.g., read-only memory), flash memory, or any combination of such memories. The system memory 515 may include an operating system 525 and one or more program modules 520 or components suitable for identifying various objects contained within captured images such as described herein.

The operating system 525, for example, may be suitable for controlling the operation of the electronic device 500. Furthermore, examples of the disclosure may be practiced in conjunction with a graphics library, other operating systems, or any other application program and is not limited to any particular application or system. This basic configuration is illustrated in FIG. 5 by those components within a dashed line 530.

The electronic device 500 may have additional features or functionality. For example, the electronic device 500 may also include additional data storage devices (removable and/or non-removable) such as, for example, magnetic disks, optical disks, or tape. Such additional storage is illustrated in FIG. 5 by a removable storage device 535 and a non-removable storage device 540.

As stated above, a number of program modules and data files may be stored in the system memory 515. While executing on the processing unit 510, the program modules 520 (e.g., an object identifier 505 that may include one or more of the various systems described above with respect to FIG. 1) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the electronic device 500 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The electronic device 500 may also have one or more input device(s) 545 such as a keyboard, a trackpad, a mouse, a pen, a sound or voice input device, a touch, force and/or swipe input device, etc. The output device(s) 550 such as a display, speakers, a printer, etc. may also be included. The aforementioned devices are examples and others may be used. The electronic device 500 may include one or more communication connections 555 allowing communications with other electronic devices 560. Examples of suitable communication connections 555 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 515, the removable storage device 535, and the non-removable storage device 540 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 500. Any such computer storage media may be part of the electronic device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
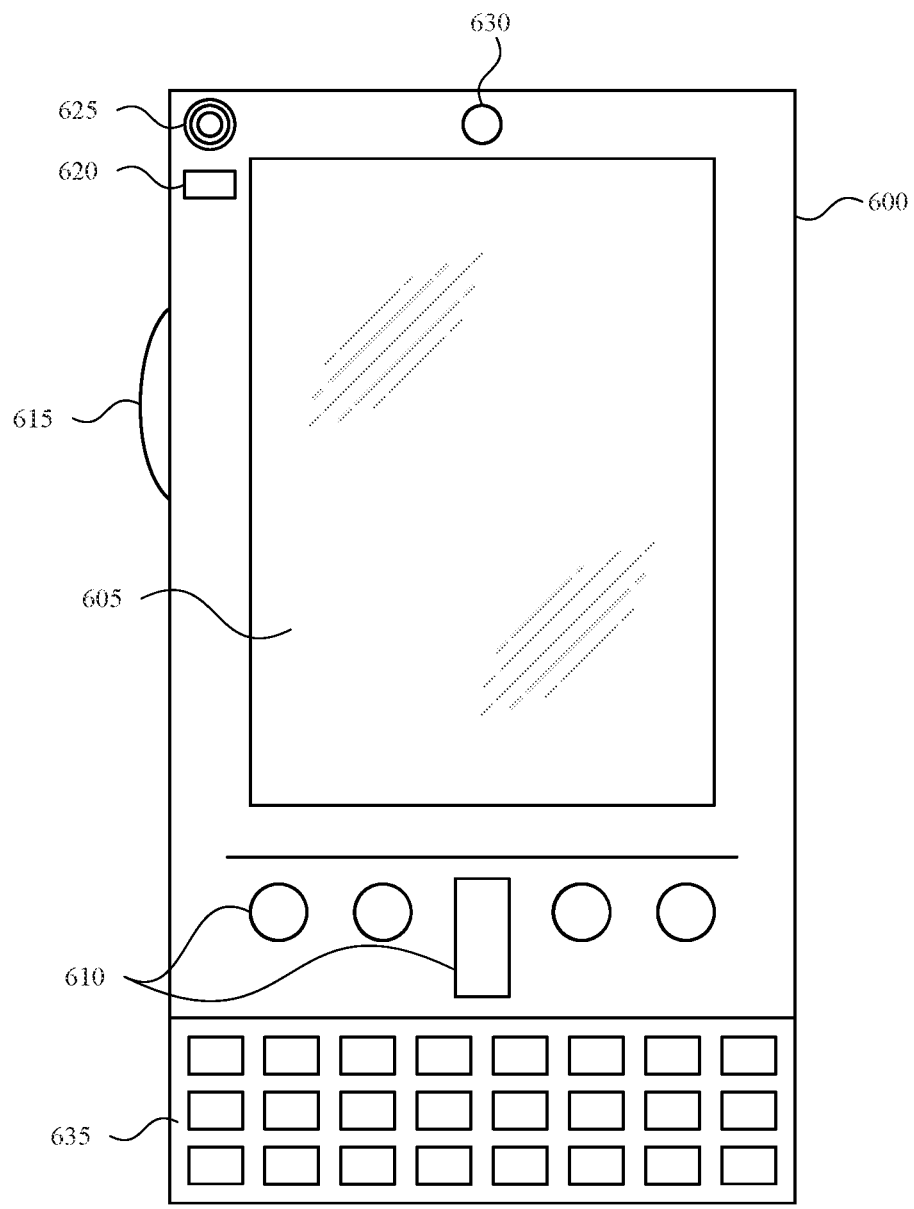
FIGS. 6A and 6B are simplified block diagrams of a mobile computing device with which aspects of the present disclosure may be practiced.
Figure 6B:
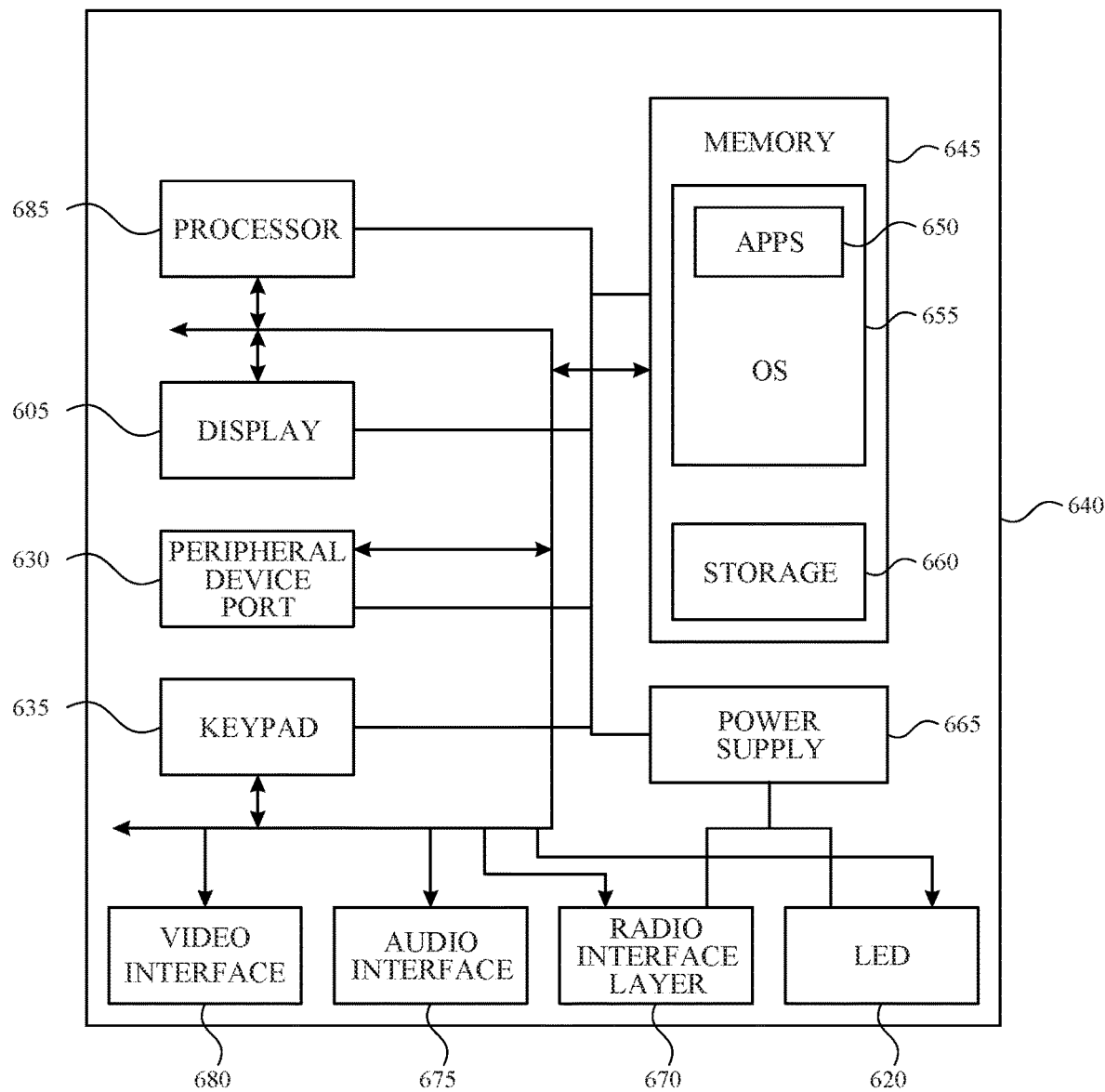

FIGS. 6A and 6B illustrate a mobile electronic device 600, for example, a mobile telephone, a smart phone, wearable computer (such as a smart watch), a tablet computer, a laptop computer, and the like, with which examples of the disclosure may be practiced. With reference to FIG. 6A, one aspect of a mobile electronic device 600 for implementing the aspects is illustrated.

In a basic configuration, the mobile electronic device 600 is a handheld computer having both input elements and output elements. The mobile electronic device 600 typically includes a display 605 and one or more input buttons 610 that allow the user to enter information into the mobile electronic device 600. The display 605 of the mobile electronic device 600 may also function as an input device (e.g., a display that accepts touch and/or force input).

If included, an optional side input element 615 allows further user input. The side input element 615 may be a rotary switch, a button, or any other type of manual input element. In alternative aspects, mobile electronic device 600 may incorporate more or less input elements. For example, the display 605 may not be a touch screen in some examples. In yet another alternative embodiment, the mobile electronic device 600 is a portable phone system, such as a cellular phone. The mobile electronic device 600 may also include an optional keypad 635. Optional keypad 635 may be a physical keypad or a "soft" keypad generated on the touch screen display.

In various examples, the output elements include the display 605 for showing a graphical user interface (GUI), a visual indicator 620 (e.g., a light emitting diode), and/or an audio transducer 625 (e.g., a speaker). In some aspects, the mobile electronic device 600 incorporates a vibration transducer for providing the user with tactile feedback. In yet another aspect, the mobile electronic device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile electronic device 600. That is, the mobile electronic device 600 can incorporate a system (e.g., an architecture) 640 to implement some aspects. In one embodiment, the system 640 is implemented as a "smart phone" capable of running one or more applications (e.g., browser, e-mail, calendaring, contact managers, messaging clients, games, media clients/players, content selection and sharing applications and so on). In some aspects, the system 640 is integrated as an electronic device, such as an integrated personal digital assistant (PDA) and wireless phone.

One or more application programs 650 may be loaded into the memory 645 and run on or in association with the operating system 655. Examples of the application programs include phone dialer programs, e-mail programs, personal information management (PIM) programs, word processing programs, spreadsheet programs, Internet browser programs, messaging programs, and so forth.

The system 640 also includes a non-volatile storage area 660 within the memory 645. The non-volatile storage area 660 may be used to store persistent information that should not be lost if the system 640 is powered down.

The application programs 650 may use and store information in the non-volatile storage area 660, such as email or other messages used by an email application, and the like. A synchronization application (not shown) also resides on the system 640 and is programmed to interact with a corresponding synchronization application resident on a host computer to keep the information stored in the non-volatile storage area 660 synchronized with corresponding information stored at the host computer.

The system 640 has a power supply 665, which may be implemented as one or more batteries. The power supply 665 may further include an external power source, such as an AC adapter or a powered docking cradle that supplements or recharges the batteries.

The system 640 may also include a radio interface layer 670 that performs the function of transmitting and receiving radio frequency communications. The radio interface layer 670 facilitates wireless connectivity between the system 640 and the "outside world," via a communications carrier or service provider. Transmissions to and from the radio interface layer 670 are conducted under control of the operating system 655. In other words, communications received by the radio interface layer 670 may be disseminated to the application programs 650 via the operating system 655, and vice versa.

The visual indicator 620 may be used to provide visual notifications, and/or an audio interface 675 may be used for producing audible notifications via an audio transducer (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 665 so that when activated, they remain on for a duration dictated by the notification mechanism even though the processor 685 and other components might shut down for conserving battery power. The LED may be programmed to remain on indefinitely until the user takes action to indicate the powered-on status of the device.

The audio interface 675 is used to provide audible signals to and receive audible signals from the user (e.g., voice input such as described above). For example, in addition to being coupled to the audio transducer 625, the audio interface 675 may also be coupled to a microphone to receive audible input, such as to facilitate a telephone conversation. In accordance with examples of the present disclosure, the microphone may also serve as an audio sensor to facilitate control of notifications, as will be described below.

The system 640 may further include a video interface 680 that enables an operation of peripheral device 630 (e.g., on-board camera) to record still images, video stream, and the like.

A mobile electronic device 600 implementing the system 640 may have additional features or functionality. For example, the mobile electronic device 600 may also include additional data storage devices (removable and/or non-removable) such as, magnetic disks, optical disks, or tape. Such additional storage is illustrated in FIG. 6B by the non-volatile storage area 660.

Data/information generated or captured by the mobile electronic device 600 and stored via the system 640 may be stored locally on the mobile electronic device 600, as described above, or the data may be stored on any number of storage media that may be accessed by the device via the radio interface layer 670 or via a wired connection between the mobile electronic device 600 and a separate electronic device associated with the mobile electronic device 600, for example, a server computer in a distributed computing network, such as the Internet. As should be appreciated such data/information may be accessed via the mobile electronic device 600 via the radio interface layer 670 or via a distributed computing network. Similarly, such data/information may be readily transferred between electronic devices for storage and use according to well-known data/information transfer and storage means, including electronic mail and collaborative data/information sharing systems.

As should be appreciated, FIG. 6A and FIG. 6B are described for purposes of illustrating the present methods and systems and is not intended to limit the disclosure to a particular sequence of steps or a particular combination of hardware or software components.

Figure 7:
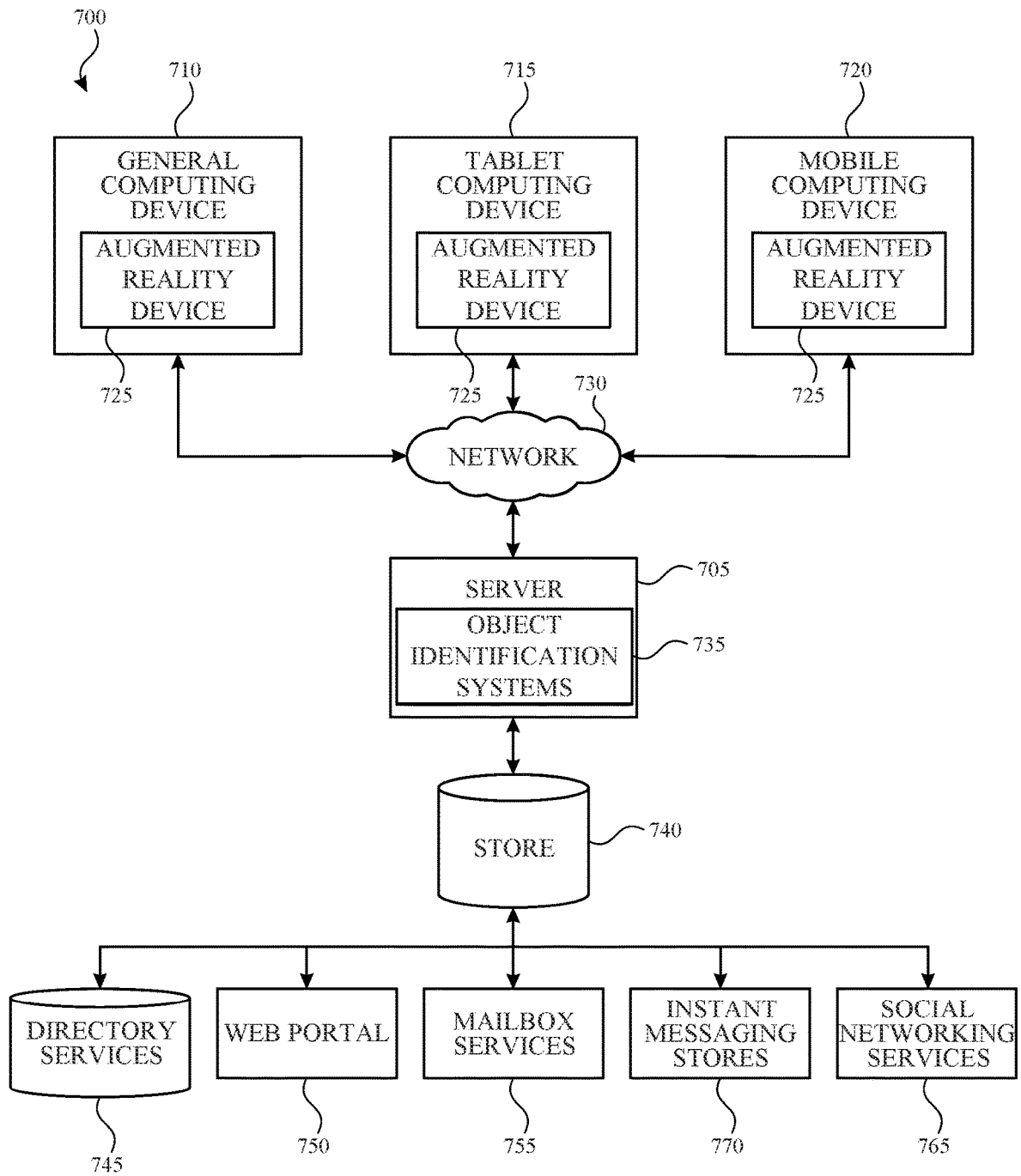
FIG. 7 is a simplified block diagram of a distributed computing system in which aspects of the present disclosure may be practiced.

FIG. 7 illustrates one aspect of the architecture of a system 700 for automatically identifying objects within one or more capture images such as described herein. The system 700 may include a general computing device 710 (e.g., personal computer), tablet computing device 715, or mobile computing device 720, as described above. Each of these devices may include, be a part of or otherwise be associated with an augmented reality device 725 such as described herein.

In some aspects, each of the general computing device 710 (e.g., personal computer), tablet computing device 715, or mobile computing device 720 may receive various other types of information or content that is stored by or transmitted from a directory service 745, a web portal 750, mailbox services 755, instant messaging stores 760, or social networking services 765.

In aspects, and as described above, one or more systems of the augmented reality device may be provide on the server 705 or some other remote computing device. These systems are shown in the figure as object identification systems 735. The object identification systems 735 may perform one or more of the operations described above with reference to FIG. 2 or FIG. 3 and provide information or other data, over the network 730 to the various computing devices.

By way of example, the aspects described above may be embodied in a general computing device 710, a tablet computing device 715 and/or a mobile computing device 720. Any of these examples of the electronic devices may obtain content from or provide data to the store 740.

As should be appreciated, FIG. 7 is described for purposes of illustrating the present methods and systems and is not intended to limit the disclosure to a particular sequence of steps or a particular combination of hardware or software components.

Figure 8:
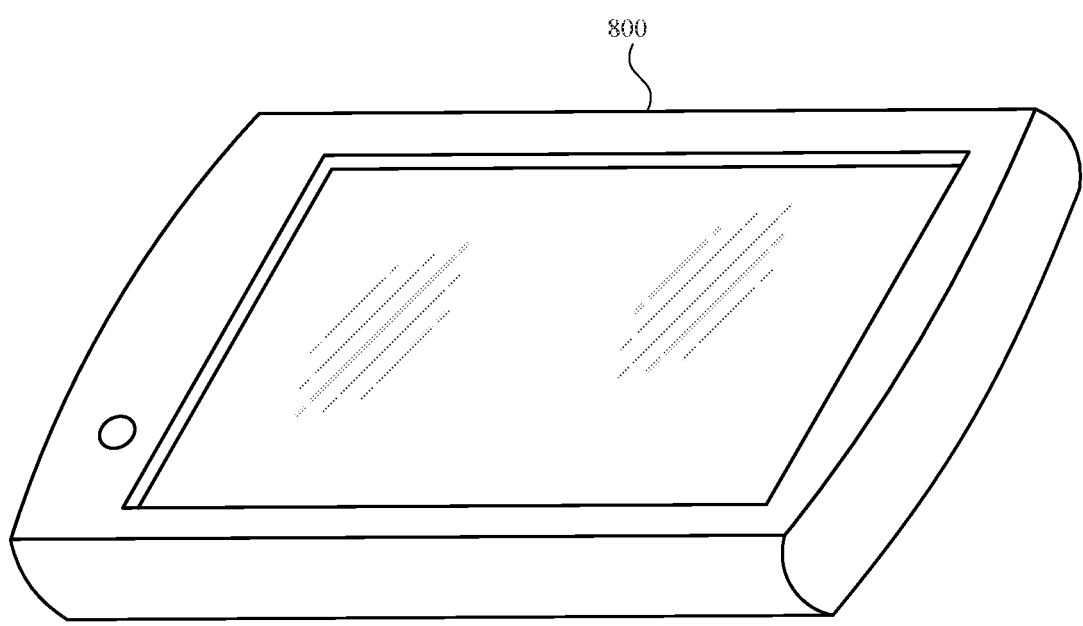
FIG. 8 illustrates a tablet computing device for executing one or more aspects of the present disclosure.

FIG. 8 illustrates an example tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, the figures herein FIG. 8 is described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for recognizing a real world object for an augmented reality environment, comprising:
    receiving a plurality of images of a real world environment, each of the plurality of images being taken from a different viewpoint;
    analyzing the plurality of images to identify an object and a type of the object contained within the plurality of images;
    analyzing the plurality of images to identify a location of one or more edges of the object within the plurality of images, wherein the one or more edges of the object are associated with one or more surfaces of the object in the real world environment; and
    projecting the determined location of the one or more surfaces of the object within the real world environment to a corresponding location in an enhanced depth map of an augmented reality environment
    wherein interaction with the object in the augmented reality environment is based, at least in part, on an identified type of the object.

2. The method of claim 1, wherein analyzing the plurality of images to identify a location of one or more edges of the object within the plurality of images comprises associating a bounding box with the object within the plurality of images.

3. The method of claim 1, wherein analyzing the plurality of images to identify a location of one or more edges of the object within the plurality of images comprises associating a pixel-level mask with the object within the plurality of images.

4. The method of claim 1, wherein projecting the determined location of the one or more surfaces of the object to a corresponding location in an enhanced depth map comprises converting two dimensional coordinates of the one or more portions of the object to corresponding three dimensional coordinates within the enhanced depth map.

5. The method of claim 1, wherein identifying the location of one or more edges of the object comprises identifying a surface of the real world object within the enhanced depth map.

6. The method of claim 5, further comprising projecting a hologram on the surface of the real world object.

7. The method of claim 1, further comprising removing noise from the plurality of images using a clustering algorithm.

8. A system, comprising:
    a processing unit; and
    a memory for storing instructions that, when executed by the processing unit, performs a method for identifying a real world object for an augmented reality environment, comprising:
        capturing a plurality of images of a real world environment, each of the plurality of images being taken from a different view point;
        identifying an object and a type of the object contained within one or more images of the plurality of images;
        identifying a location of the object within the one or more images;
        determining one or more edges of the object within the one or more images; and
        projecting the one or more edges of the object within the one or more images to corresponding locations within an enhanced depth map to identify a surface of the object for the augmented reality environment,
        wherein interaction with the object in the augmented reality environment is based, at least in part, on an identified type of the object.

9. The system of claim 8, further comprising instructions for determining one or more regions of the object within the one or more images.

10. The system of claim 9, further comprising instructions for aggregating the one or more regions of the object within the one or more images to additional regions of the object identified in one or more additional images.

11. The system of claim 8, further comprising instructions for determining a background contained in at least one image of the one or more images.

12. The system of claim 11, further comprising instructions for removing the background contained in the at least one image of the one or more images.

13. The system of claim 8, further comprising instructions for determining an orientation of the surface.

14. The system of claim 8, wherein projecting the one or more edges of the object within the one or more images to corresponding locations within the enhanced depth map comprises determining an intersection point associated with the surface.

15. A system, comprising:
    a processing unit; and
    a memory for storing instructions that, when executed by the processing unit, performs a method for identifying a real world object for an augmented reality environment, comprising:
        capturing a plurality of images at different viewpoint in a real world environment;
        analyzing the plurality of images to identify an object and a type of the object contained within one or more of the plurality of images;
        determining two dimensional coordinates of at least a portion of the object within the image;

converting the two dimensional coordinates to three dimensional coordinates associated with an enhanced depth map of an augmented reality environment; and associating the identification of the object with the three dimensional coordinates associated with the enhanced depth map.

16. The system of claim 15, further comprising instructions for identifying a type of object by analyzing one or more of the plurality of images.

17. The system of claim 15, wherein analyzing the plurality of images to identify an object contained within one or more of the plurality of images comprises using a pixel-level mask to identify the object.

18. The system of claim 15, wherein analyzing the plurality of images to identify an object contained within one or more of the plurality of images comprises using a bounding box to identify the object.

19. The system of claim 15, further comprising instructions for clustering the three dimensional coordinates to identify a surface of the object.

20. The system of claim 15, further comprising instructions for:

determining which portions of the image in the plurality of images include a background associated with the object; and removing the background portions within the enhanced depth map.

* * * * *